United States Patent
Chang et al.

(10) Patent No.: US 12,534,573 B2
(45) Date of Patent: *Jan. 27, 2026

(54) IN SITU POLYMERIZED FLAME RETARDANT, PREPARATION METHOD THEREOF, AND MOLDING COMPOSITION COMPRISING THEREOF

(71) Applicant: KINGFA SCI. & TECH. CO., LTD., Guangdong (CN)

(72) Inventors: Huan Chang, Guangdong (CN); Xianbo Huang, Guangdong (CN); Nanbiao Ye, Guangdong (CN); Min Cao, Guangdong (CN); Chuanhui Zhang, Guangdong (CN); Sujun Jiang, Guangdong (CN); Mingchen Xie, Guangdong (CN); Kun Yan, Guangdong (CN); Zhongquan Peng, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 950 days.

This patent is subject to a terminal disclaimer.

(21) Appl. No.: 17/609,409

(22) PCT Filed: Apr. 10, 2020

(86) PCT No.: PCT/CN2020/084263
§ 371 (c)(1),
(2) Date: Nov. 8, 2021

(87) PCT Pub. No.: WO2020/224376
PCT Pub. Date: Nov. 12, 2020

(65) Prior Publication Data
US 2022/0251297 A1    Aug. 11, 2022

(30) Foreign Application Priority Data

May 9, 2019  (CN) .......................... 201910383955.2

(51) Int. Cl.
*C08G 69/42* (2006.01)
*C08L 77/06* (2006.01)

(52) U.S. Cl.
CPC .............. *C08G 69/42* (2013.01); *C08L 77/06* (2013.01); *C08L 2201/02* (2013.01); *C08L 2205/025* (2013.01)

(58) Field of Classification Search
CPC .......... C08G 69/00; C08G 69/42; C08L 77/06
See application file for complete search history.

(56) References Cited

U.S. PATENT DOCUMENTS

| | | |
|---|---|---|
| 5,859,147 A | 1/1999 | Dalla Torre et al. |
| 2013/0123402 A1 | 5/2013 | Freitag et al. |
| 2022/0227935 A1* | 7/2022 | Huang ................. C08G 69/265 |

FOREIGN PATENT DOCUMENTS

| | | |
|---|---|---|
| CN | 101735609 | 6/2010 |
| CN | 104231262 | 12/2014 |
| CN | 106496548 | 3/2017 |
| CN | 106496551 | 3/2017 |
| CN | 110204708 | 9/2019 |
| JP | H10131056 | 5/1998 |

OTHER PUBLICATIONS

CN104231262 machine translation (Year: 2024).*
JPH10131056 machine translation (Year: 2024).*
"International Search Report (Form PCT/ISA/210) of PCT/CN2020/084263" mailed on Jun. 30, 2020, with English translation thereof, pp. 1-6.

* cited by examiner

*Primary Examiner* — Jeffrey S Lenihan
(74) *Attorney, Agent, or Firm* — JCIPRNET

(57) ABSTRACT

The invention discloses an in situ polymerized flame retardant, derived from the following monomers: a diacid monomer A: where A1 is terephthalic acid, A2 is a phosphorus aromatic ring-containing reactive flame-retardant diacid monomer, A1+A2=100 mol %, A1=50 to 90 mol %, A2=10 to 50 mol %; and a diamine monomer B: one or more of diamine monomers containing 4 to 36 carbon atoms. In the present invention, a novel flame retardant is obtained by in situ polymerization of the phosphorus aromatic ring-containing reactive flame-retardant diacid monomers in semi-aromatic polyamide oligomers, which has advantages of no precipitation in the semi-aromatic polyamide and no influence on other properties of the semi-aromatic polyamide and has an excellent flame-retardant property.

11 Claims, No Drawings

IN SITU POLYMERIZED FLAME RETARDANT, PREPARATION METHOD THEREOF, AND MOLDING COMPOSITION COMPRISING THEREOF

CROSS-REFERENCE TO RELATED APPLICATION

This application is a 371 of international application of PCT application serial no. PCT/CN2020/084263, filed on Apr. 10, 2020, which claims the priority benefit of China application no. 201910383955.2, filed on May 9, 2019. The entirety of each of the above mentioned patent applications is hereby incorporated by reference herein and made a part of this specification.

TECHNICAL FIELD

The present invention relates to the technical field of novel polymer materials, and particularly relates to an in situ polymerized flame retardant, a preparation method thereof, and a molding composition comprising thereof.

DESCRIPTION OF RELATED ART

Polyamide is the most widely used engineering plastic, which has important applications in fields of electronic appliances, home appliances, etc. However, a flammable nature of the polyamide itself greatly limits the application and promotion of the polyamide. Therefore, a flame-retardant modification of the polyamide has a very important significance.

At present, a flame-retardant modifier for polyamide is divided into a halogen-containing flame-retardant modifier and a halogen-free flame-retardant modifier. However, the halogen-containing flame-retardant material will generate a large amount of halogen-containing toxic and corrosive gas when burned, causing secondary harm. With increasingly strict environmental protection requirements, people's demand for the halogen-free flame-retardant material is becoming more and more urgent. The halogen-free flame retardant modifier mainly includes a phosphorus flame retardant, a nitrogen flame retardant, and a silicon flame retardant, etc, among which, the phosphorus flame retardant has the best flame-retardant effect.

Generally, a phosphorus-containing inorganic salt is mostly used in the phosphorus flame retardant. For example, patent CN100564454C discloses a hypophosphite flame-retardant modified polyamide; however, this type of flame retardant is a small molecule inorganic salt and has relatively poor compatibility with a high molecule resin matrix, which is easy to cause uneven distribution problems such as agglomeration, precipitation or migration to a surface of the material, affecting properties of the material. In U.S. Pat. No. 5,859,147A an alkyl compound containing a phosphate ester structure is synthesized, which can solve the problem of surface precipitation of the flame retardant to a certain extent, but the structure of this compound determines that it has better compatibility only with an amorphous polyamide, which only solves the problem of surface migration of the flame retardant in the amorphous polyamide, but has no effect on crystalline and semi-crystalline semi-aromatic polyamides.

SUMMARY

An objective of the present invention is to overcome the above technical defects and provide an in situ polymerized flame retardant, as an in situ polymerized semi-aromatic polyamide oligomer, which has advantages of no precipitation in the semi-aromatic polyamide and no influence on other properties of the semi-aromatic polyamide. The present invention also provides a preparation method of the above-mentioned in situ polymerized flame retardant.

Another objective of the present invention is to provide a polyamide molding composition added with the in situ polymerized flame retardant of the present invention, which has advantages of a good flame-retardant effect and a good mechanical property.

The present invention is realized through the following technical solutions.

An in situ polymerized flame retardant, derived from the following monomers:
  a diacid monomer A: where A1 is terephthalic acid, A2 is a phosphorus aromatic ring-containing reactive flame-retardant diacid monomer, A1+A2=100 mol %, A1=50 to 90 mol %, A2=10 to 50 mol %; and
  a diamine monomer B: one or more of diamine monomers containing 4 to 36 carbon atoms.

The phosphorus aromatic ring-containing reactive flame-retardant diacid monomer is selected from at least one of 3-hydroxyphenylphosphinyl propanoic acid (CEPPA), bis(p-carboxyphenyl)phenyl phosphine oxide (BCPPO), bis(p-carboxyphenyl)methyl phosphine oxide (BCMPO), bis(p-carboxyphenyl)ethyl phosphine oxide (BCEPO), [(6-oxido-6H-dibenzo-(c,e)(1,2)-oxaphosphorin-6-ketone)methyl]-butanedioic acid (DDP).

The preferred phosphorus aromatic ring-containing reactive flame-retardant diacid monomer of the present invention does not contain a nitrogen element.

Preferably, the phosphorus aromatic ring-containing reactive flame-retardant diacid monomer is selected from [(6-oxido-6H-dibenzo-(c,e)(1,2)-oxaphosphorin-6-ketone) methyl]-butanedioic acid, which structural formula is as follows:

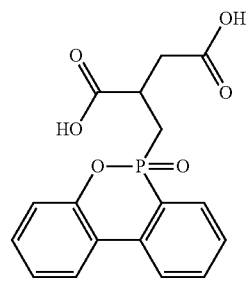 [SMILES: O=C(O)CC(CP1(=O)Oc2ccccc2-c2ccccc21)C(=O)O]

A relative viscosity of the in situ polymerized flame retardant is 1.2 to 1.5, under a test condition being in 98% concentrated sulfuric acid at 25° C.±0.01° C., with a concentration of the in situ polymerized flame retardant being 10 mg/mL. In the present invention the relative viscosity is used to characterize a molecular weight of the in situ polymerized flame retardant. When the in situ polymerized flame retardant reaches a certain relative viscosity range, it has a good anti-precipitation effect, reflecting in that a polyamide molding composition comprising thereof has a better mechanical property.

Preferably, in the diacid monomer A, a content of A2 is 15 to 40 mol %. At the preferred A2 content, a preparation difficulty, a flame-retardant property, and an anti-precipitation ability are all well balanced, which is more valuable in application. The content of A2 can be any content from 15 mol % to 40 mol %, and specifically can be 15 mol %, 17 mol %, 19 mol %, 21 mol %, 23 mol %, 25 mol %, 27 mol %, 29 mol %, 31 mol %, 33 mol %, 35 mol %, 37 mol %, 39 mol %, and 40 mol %.

The diamine monomer B is selected from one or more of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,14-tetradecanediamine, 1,16-hexadecandiamine, 1,18-octadecanediamine, 1-butyl-1,2-ethylenediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine.

Preferably, the diamine monomer B is selected from at least one of 1,10-decanediamine and 1,6-hexanediamine.

A preparation method of the above-mentioned in situ polymerized flame retardant includes the following steps: weighing the diacid monomer A, the diamine monomer B, a catalyst (which may be sodium hypophosphite), and deionized water into a high-temperature high-pressure reactor, after gas aerating and exchange to make atmosphere in the reactor as nitrogen, heating up to 160 to 180° C., reacting at a constant temperature for 0.5 hours, continuing to heat up to 200 to 210° C., and reacting at a constant temperature for 0.5 hours, continuing to heat up to 240 to 250° C., reacting at a constant temperature for 1 hour, draining for about 0.5 hours and discharging to obtain the in situ polymerized flame retardant.

A polyamide molding composition comprising the above-mentioned in situ polymerized flame retardant, in parts by weight, includes the following components:

40 to 100 parts of a semi-aromatic polyamide; and 5 to 45 parts of the in situ polymerized flame retardant.

In a diacid monomer of the semi-aromatic polyamide, a content of terephthalic acid is 50 to 100 mol %; a diamine monomer of the semi-aromatic polyamide is selected from one or more of diamines having 4 to 36 carbon atoms. The diamine having 4 to 36 carbon atoms is selected from at least one of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,14-tetradecanediamine, 1,16-hexadecandiamine, 1,18-octadecanediamine, 1,36-trihexadecanediamine, and other linear aliphatic diamines; 1-butyl-1,2-ethylenediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, 5-methyl-1,9-nonanediamine, and other linear aliphatic diamines; diaminocyclohexane, methyl diaminocyclohexane, isophorondiamine, norbornane dimethylamine, tricyclodecane dimethylamine, and other alicyclic diamines. Preferably, the diamine having 4 to 36 carbon atoms is selected from at least one of 1,10-decanediamine and 1,6-hexanediamine.

For the semi-aromatic polyamide, when measured in 98% concentrated sulfuric acid at 25° C.±0.01° C., a relative viscosity of the semi-aromatic polyamide resin with a concentration of 10 mg/ml is 1.7 to 2.8, and preferably 2.0 to 2.3.

In parts by weight, the polyamide molding composition further includes at least one of a reinforcing fiber, a filler, an additive, and a processing aid.

An average length of the reinforcing fiber is 0.01 mm to 20 mm, and preferably 0.1 mm to 6 mm; a length-diameter ratio thereof is 5:1 to 3500:1, and preferably 30:1 to 600:1; based on a total weight percentage of the polyamide molding composition, a content of the reinforcing fiber is 10 wt % to 50 wt %, and more preferably 15 wt % to 40 wt %; the reinforcing fiber is an inorganic reinforcing fiber or an organic reinforcing fiber, and the inorganic reinforcing fiber includes but is not limited to one or more of glass fiber, potassium titanate fiber, metal-clad glass fiber, ceramic fiber, wollastonite fiber, metal carbide fiber, metal curing fiber, asbestos fiber, alumina fiber, silicon carbide fiber, gypsum fiber, and boron fiber.

The filler has an average particle size of 0.001 μm to 100 μm, and preferably 0.01 μm to 50 μm, and includes but is not limited to one or more of potassium titanate whisker, zinc oxide whisker, aluminum borate whisker, wollastonite, zeolite, kaolin, mica, talc, clay, pyrophyllite, bentonite, montmorillonite, asbestos, aluminosilicate, alumina, silicon oxide, magnesium oxide, zirconia, titanium oxide, iron oxide, calcium carbonate, magnesium carbonate, dolomite, calcium sulfate, barium sulfate, magnesium hydroxide, calcium hydroxide, aluminum hydroxide, glass bead, ceramic bead, boron nitride, silicon carbide or silicon dioxide. The mica may be ordinary mica, or may be sericite, fluorophlogopite (synthetic mica), etc.; the montmorillonite may be ordinary montmorillonite, or may be lithium montmorillonite, or montmorillonite modified in other ways.

In the present invention there are no special requirements on the additive and the processing aid of the polyamide molding composition. The additive may be a toner, an anti-ultraviolet agent or an additional weather-resistant agent, etc.; the processing aid may be a lubricant, and an antioxidant, etc., and may be selected according to processing conditions of the polyamide molding composition and other properties required to have.

Compared with the prior art, the present invention has the following beneficial effects.

In the present invention, an in situ polymerized flame retardant is obtained by an in situ copolymerization of phosphorus aromatic ring-containing reactive flame-retardant diacid monomers in the semi-aromatic polyamide oligomer. A semi-aromatic polyamide molding composition comprising the in situ polymerized flame retardant has a good flame-retardant property and a good mechanical property. It avoids uneven distribution problems such as agglomeration, precipitation or migration to a surface of the material in the composition during flame-retardant modification of an inorganic small molecule phosphorus flame retardant, and a technical problem of an alkyl compound containing a phosphate ester structure has good compatibility only with an amorphous polyamide.

DESCRIPTION OF THE EMBODIMENTS

The present invention is further illustrated by the following embodiments, but which shall not be understood as limitation of the protection scope of the present invention.

Raw materials used in Embodiments and Comparative Examples of the present invention are derived from commercially available products.

PA10T: Vicnyl 700;
PA6T66: Vicnyl 400;
Antioxidant: Antioxidant 1098;
Lubricant: polyethylene wax;
OP935: diethyl hypophosphite;
CEMPO: bis(2-carboxyethyl)methyl phosphine oxide;
Glass fiber: 568H, with an average length of 4 mm and a diameter of 13 microns.

A preparation method of an in situ copolymerized flame retardant: according to monomers of the in situ copolymerized flame retardant and molar contents thereof in Table 1, weighing a diacid monomer A, a diamine monomer B, sodium hypophosphite, and deionized water into a high-temperature high-pressure reactor, after gas aerating and exchange to make atmosphere in the reactor as nitrogen, heating up to 160 to 180° C., reacting at a constant temperature for 0.5 hours, continuing to heat up to 200 to 210° C., and reacting at a constant temperature for 0.5 hours, continuing to heat up to 240 to 250° C., reacting at a constant temperature for 1 hour, draining for about 0.5 hours and discharging to obtain the in situ polymerized flame retardant.

A preparation method of the polyamide molding composition in the Embodiments and the Comparative Examples: according to a formula, mixing uniformly a semi-aromatic polyamide resin, a flame retardant (the in situ copolymerized flame retardant or OP935), and other auxiliary agents in a high-speed mixer, adding into a twin-screw extruder through a main feeding port, side feeding a reinforcing filler through a side feeding scale, extruding, cooling with water, granulating and drying, to obtain the polyamide molding composition.

Test Methods of Various Properties (1) Relative viscosity: with reference to a standard GB/T 12006.1-1989, using a Ubbelohde viscometer to measure a relative viscosity of a product with a concentration of 0.25 g/dL in 98% concentrated sulfuric acid at (25±0.01°) C.

(2) Tensile strength: with reference to ISO 527, tensile strength of a resin material is tested.

(3) Bending strength: with reference to a standard ISO 178, bending strength of a resin material is tested.

(4) Notched impact strength/unnotched impact strength: with reference to a standard ISO 180, impact strength of a resin material is tested.

(5) UL94 flame-retardant rating: measured with reference to GB/T2408-1996, with a test sample size of 13 cm×1.3 cm×0.3 cm.

(6) Limiting oxygen index (LOI): measured with reference to a standard GB/T5454-1997, with a test sample size of 12 cm×1 cm×0.4 cm.

TABLE 1

| In situ copolymerized flame retardants | | | | | |
|---|---|---|---|---|---|
| No. of in situ copolymerized flame retardants | A | B | C | D | E |
| In situ copolymerized flame retardant | 10T10DDP | 10T10DDP | 10T10DDP | 10T10DDP | 6T6DDP |
| mol % of A2 accounting for a diacid monomer | 10 | 15 | 40 | 50 | 25 |
| Relative viscosity | 1.35 | 1.37 | 1.35 | 1.36 | 1.40 |
| No. of in situ copolymerized flame retardants | F | G | H | I | J |
| In situ copolymerized flame retardant | 10T10CEPPA | 10T10BCPPO | 10T10DDP | 10T10DDP | 10T10CEMPO |
| mol % of A2 accounting for a diacid monomer | 15 | 15 | 15 | 15 | 15 |
| Relative viscosity | 1.42 | 1.41 | 1.13 | 1.56 | 1.41 |

TABLE 2

Formulas and test results of various properties of polyamide molding compositions in the Embodiments and the Comparative Examples

| | Embodiment 1 | Embodiment 2 | Embodiment 3 | Embodiment 4 |
|---|---|---|---|---|
| Semi-aromatic polyamide | | PA10T | | |
| Resin content, parts | 55 | 55 | 55 | 55 |
| Flame retardant | A | B | C | D |
| Flame retardant content, parts | 15 | 15 | 15 | 15 |
| Glass fiber, parts | 29 | 29 | 29 | 29 |
| Antioxidant, parts | 0.5 | 0.5 | 0.5 | 0.5 |
| Lubricant, parts | 0.5 | 0.5 | 0.5 | 0.5 |
| Tensile strength MPa | 155 | 167 | 165 | 157 |
| Bending strength MPa | 245 | 265 | 263 | 250 |
| Notched impact strength kJ/m$^2$ | 11 | 12 | 12 | 11 |
| Unnotched impact strength kJ/m$^2$ | 36 | 41 | 40 | 35 |
| UL flame-retardant rating | V0 | V0 | V0 | V0 |
| LOI | 34 | 36 | 36 | 34 |

| | Embodiment 5 | Embodiment 6 | Embodiment 7 | Embodiment 8 | Comparative Example 1 | Comparative Example 2 |
|---|---|---|---|---|---|---|
| Semi-aromatic polyamide | | | PA10T | | | |
| Resin content, parts | 55 | 55 | 55 | 55 | 55 | 55 |
| Flame retardant | F | G | H | I | J | OP935 |
| Flame retardant content, parts | 15 | 15 | 15 | 15 | 15 | 15 |
| Glass fiber, parts | 29 | 29 | 29 | 29 | 29 | 29 |
| Antioxidant, parts | 0.5 | 0.5 | 0.5 | 0.5 | 0.5 | 0.5 |
| Lubricant, parts | 0.5 | 0.5 | 0.5 | 0.5 | 0.5 | 0.5 |
| Tensile strength MPa | 162 | 164 | 133 | 142 | 125 | 110 |
| Bending strength MPa | 261 | 263 | 212 | 220 | 197 | 180 |
| Notched impact strength kJ/m$^2$ | 12 | 12 | 10 | 10 | 9 | 8 |
| Unnotched impact strength kJ/m$^2$ | 38 | 39 | 31 | 33 | 27 | 25 |
| UL flame-retardant rating | V0 | V0 | V0 | V0 | V1 | V2 |
| LOI | 35 | 35 | 33 | 33 | 31 | 30 |

| | Embodiment 9 | Comparative example 3 |
|---|---|---|
| Semi-aromatic polyamide | | PA6T66 |
| Resin content, parts | 55 | 55 |
| Flame retardant | E | OP935 |
| Flame retardant content, parts | 15 | 15 |
| Glass fiber, parts | 29 | 29 |
| Antioxidant, parts | 0.5 | 0.5 |
| Lubricant, parts | 0.5 | 0.5 |
| Tensile strength MPa | 190 | 119 |
| Bending strength MPa | 270 | 194 |
| Notched impact strength kJ/m$^2$ | 11 | 7 |
| Unnotched impact strength kJ/m$^2$ | 65 | 38 |
| UL flame-retardant rating | V0 | V2 |
| LOI | 36 | 30 |

It can be seen from Embodiments 1 to 4 that at the preferred A2 content, the polyamide molding composition has both relatively good mechanical properties and flame-retardant property.

It can be seen from Embodiment 2 or 5 or 6 that the flame retardant monomer DDP is preferred.

It can be seen from Embodiment 2 or 7 or 8 that the preferred relative viscosity range is 1.2 to 1.5.

It can be seen from Comparative Example 1 or 2 or 3 that compared with the conventional bis(2-carboxyethyl)methyl phosphine oxide inorganic phosphorus flame retardant, the in situ copolymerized flame retardant containing a phosphorus aromatic ring-containing reactive flame-retardant diacid monomer synthesized in the present invention has better compatibility and strong anti-precipitation ability, which has less influence on properties of the semi-aromatic polyimide resin itself, and has a better flame-retardant effect.

What is claimed is:

1. An in situ polymerized flame retardant, wherein the in situ polymerized flame retardant is derived from the following monomers:
a diacid monomer A consisting of a diacid monomer A1 and a diacid monomer A2, wherein the diacid monomer A1 is terephthalic acid, the diacid monomer A2 is a phosphorus aromatic ring-containing reactive flame-retardant diacid monomer, a total content of the diacid monomer A1 and the diacid monomer A2 is 100 mol %, a content of the diacid monomer A1 is 60 to 85 mol %, and a content of the diacid monomer A2 is 15 to 40 mol %; and a diamine monomer B including one or more of diamine monomers containing 4 to 36 carbon atoms, wherein the phosphorus aromatic ring-containing reactive flame-retardant diacid monomer is at least one member selected from the group consisting of 3-hydroxyphenylphosphinyl propanoic acid, bis(p-carboxyphenyl) phenyl phosphine oxide, bis(p-carboxyphenyl)methyl phosphine oxide, bis(p-carboxyphenyl)ethyl phosphine oxide, and [(6-oxido-6H-dibenzo-(c,e)(1,2)-oxaphosphorin-6-ketone)methyl]-butanedioic acid, wherein a relative viscosity of the in situ polymerized flame retardant is 1.2 to 1.5, under a test condition being in 98% concentrated sulfuric acid at 25° C.±0.01° C., with a concentration of the in situ polymerized flame retardant being 10 mg/mL.

2. The in situ polymerized flame retardant according to claim 1, wherein the diamine monomer B is at least one member selected from the group consisting of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,14-tetradecanediamine, 1,16-hexadecandiamine, 1,18-octadecanediamine, 1-butyl-1,2-ethylenediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine.

3. A preparation method of the in situ polymerized flame retardant according to claim 1, comprising the following steps: weighing the diacid monomer A, the diamine monomer B, a catalyst, and deionized water into a high-temperature high-pressure reactor, after gas aerating and exchange to make atmosphere in the reactor as nitrogen, heating up to 160 to 180° C., reacting at a constant temperature for 0.5 hours, continuing to heat up to 200 to 210° C., and reacting at a constant temperature for 0.5 hours, continuing to heat up to 240 to 250° C., reacting at a constant temperature for 1 hour, draining for about 0.5 hours and discharging to obtain the in situ polymerized flame retardant.

4. A polyamide molding composition composed of the in situ polymerized flame retardant according to claim 1, wherein in parts by weight, the polyamide molding composition comprises the following components:

40 to 100 parts of a semi-aromatic polyamide; and
5 to 45 parts of the in situ polymerized flame retardant.

5. The polyamide molding composition according to claim 4, wherein in a diacid monomer of the semi-aromatic polyamide, a content of terephthalic acid is 50 to 100 mol %; a diamine monomer of the semi-aromatic polyamide is selected from one or more of a diamine having 4 to 36 carbon atoms; the diamine having 4 to 36 carbon atoms is selected from at least one of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,14-tetradecanediamine, 1,16-hexadecandiamine, 1,18-octadecanediamine, 1,36-trihexadecanediamine, and other linear aliphatic diamines; 1-butyl-1,2-ethylenediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, 5-methyl-1,9-nonanediamine, and other linear aliphatic diamines; diaminocyclohexane, methyl diaminocyclohexane, isophorondiamine, norbornane dimethylamine, tricyclodecane dimethylamine, and other alicyclic diamines.

6. The polyamide molding composition according to claim 4, wherein for the semi-aromatic polyamide, when measured in 98% concentrated sulfuric acid at 25° C.±0.01° C., a relative viscosity of the semi-aromatic polyamide resin with a concentration of 10 mg/ml is 1.7 to 2.8.

7. The polyamide molding composition according to claim 4, wherein in parts by weight, the polyamide molding composition further comprises at least one of a reinforcing fiber, a filler, an additive, and a processing aid.

8. The in situ polymerized flame retardant according to claim 1, wherein the phosphorus aromatic ring-containing reactive flame-retardant diacid monomer is selected from [(6-oxido-6H-dibenzo-(c,e)(1,2)-oxaphosphorin-6-ketone) methyl]-butanedioic acid.

9. A preparation method of the in situ polymerized flame retardant according to claim 2, comprising the following steps: weighing the diacid monomer A, the diamine monomer B, a catalyst, and deionized water into a high-temperature high-pressure reactor, after gas aerating and exchange to make atmosphere in the reactor as nitrogen, heating up to 160 to 180° C., reacting at a constant temperature for 0.5 hours, continuing to heat up to 200 to 210° C., and reacting at a constant temperature for 0.5 hours, continuing to heat up to 240 to 250° C., reacting at a constant temperature for 1 hour, draining for about 0.5 hours and discharging to obtain the in situ polymerized flame retardant.

10. A polyamide molding composition comprising the in situ polymerized flame retardant according to claim 5, wherein in parts by weight, the polyamide molding composition comprises the following components:

40 to 100 parts of a semi-aromatic polyamide; and
5 to 45 parts of the in situ polymerized flame retardant.

11. The polyamide molding composition according to claim 6, wherein for the semi-aromatic polyamide, when measured in 98% concentrated sulfuric acid at 25° C.±0.01° C., the relative viscosity of the semi-aromatic polyamide resin with the concentration of 10 mg/ml is 2.0 to 2.3.

* * * * *